(No Model.)

J. BARTLETT.
ROOT HARVESTING MACHINE.

No. 251,161. Patented Dec. 20, 1881.

WITNESSES:
Chas. Nida
C. Sedgwick

INVENTOR:
J. Bartlett
BY Munn & Co.
ATTORNEYS.

UNITED STATES PATENT OFFICE.

JOHN BARTLETT, OF OSHAWA, ONTARIO, CANADA.

ROOT-HARVESTING MACHINE.

SPECIFICATION forming part of Letters Patent No. 251,161, dated December 20, 1881.

Application filed April 25, 1881. (No model.)

*To all whom it may concern:*

Be it known that I, JOHN BARTLETT, of Oshawa, in the Province of Ontario, Dominion of Canada, have invented a new and useful Improvement in Root-Harvesting Machines, of which the following is a specification.

Figure 1:
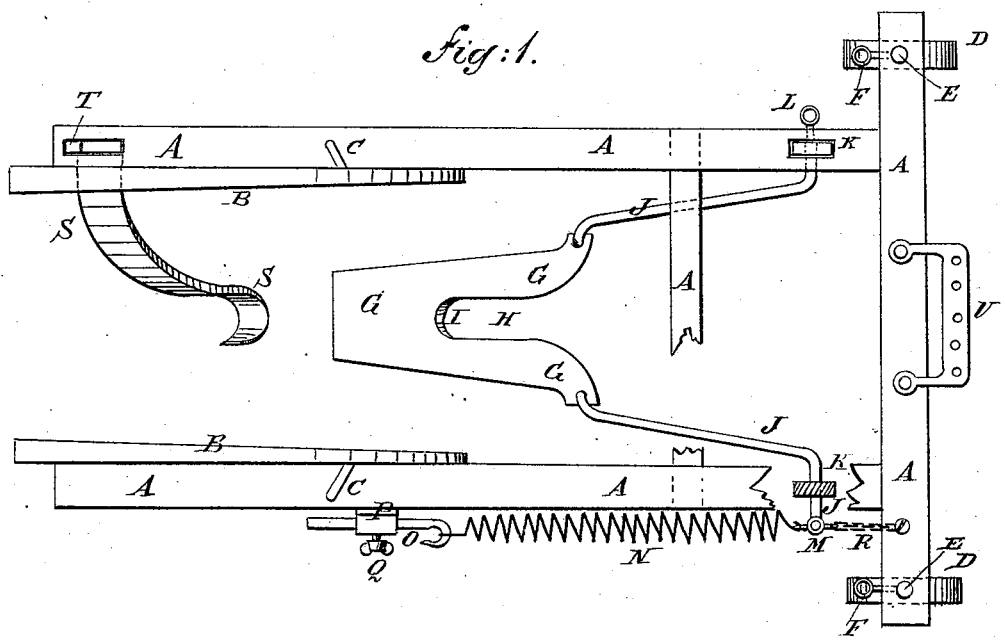
Figure 2:
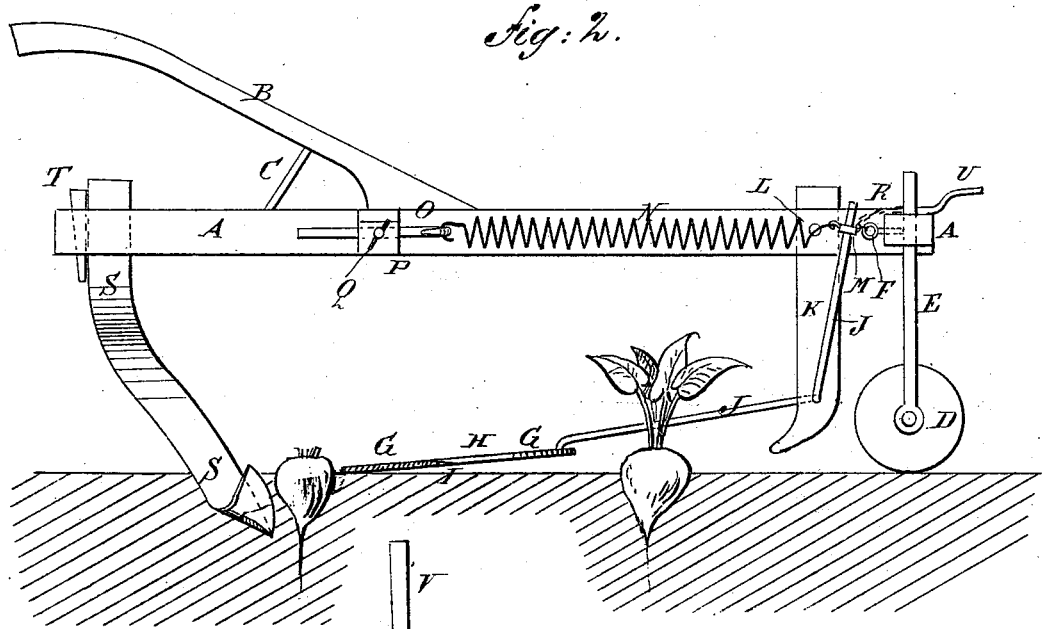
Figure 3:
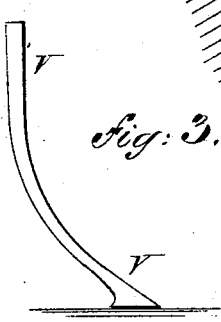

Figure 1 is a plan view of my improvement, part being broken away. Fig. 2 is a side elevation of the same. Fig. 3 represents a tooth for loosening the soil around long roots.

Similar letters of reference indicate corresponding parts.

The object of this invention is to facilitate the harvesting of turnips and other roots.

A represents the frame of the machine, which is formed of two side bars connected at their forward ends and at a little distance from their forward ends by cross-bars.

To the side bars of the frame A are attached the handles B, which are strengthened in position by braces C, attached to them and to the said side bars.

The forward part of the machine is supported by the wheels D, which are pivoted to the lower ends of the standards E. The standards E pass up through holes in the projecting end parts of the forward cross-bar of the frame A, and are secured in place by set-screws F or other suitable means, so that they can be adjusted to support the frame A at any desired distance from the ground.

G is a steel plate, in the forward end of which is formed a U-shaped recess, H. The edges of the plate G, at the opposite sides of the recess H, are blunt, so that they cannot cut or injure the turnip or other root with which they may come in contact. The edge I of the plate G, at the inner end of the recess H, is made sharp to cut off the leaves or tops of the turnips. The recess H is made of such a width as to receive the neck but not the bulb of a turnip, so that when the forward end of the cutter G, as the machine is drawn forward, strikes a turnip the said forward end of the knife will rise and pass over the bulb of the turnip, the neck of the turnip entering the said recess H and the leaves or tops being cut off by the sharpened edge I at the inner end of the said recess.

To the outer corners of the forward end of the knife or cutter G are hinged the rear ends of two rods, J, which pass forward with a slight outward and upward inclination, and are bent outward at right angles with the length of the machine, and pass through and are thus hinged to the lower parts of the hangers K. The hangers K pass up through mortises in the forward parts of the side bars of the frame A, and are secured in place adjustably by set-screws L or other suitable means, so that they can be readily raised and lowered to give a proper inclination to the cutter G when the draft is applied to it. At the outer side of one of the hangers K one of the rods J is bent upward, and to its upper end is attached, by a hook-nut, M, or other suitable means, the forward end of a spiral or other suitable spring, N, or the end of the suspension-cord of an equivalent weight. The other end of the spring N is hooked upon a hook, O, the shank of which passes through an eye or socket block, P, attached to the side bar of the frame A, and is secured in place by a set-screw, Q, or other suitable means, so that the tension of the spring N can be regulated by adjusting the said hook O.

To the forward cross-bar of the frame A is attached a chain, R, the rear end of which is connected with the upper end of the rod J by the hook-nut M or other suitable means. By this arrangement the chain R prevents the upper end of the rod J from being drawn to the rearward beyond a fixed point, while the spring N allows the said upper end to swing forward should the knife G strike an obstruction.

In a mortise in the rear end of one of the side bars of the frame A is secured the shank of a knife, S, by a key, T, a set-screw, or other suitable means. The knife S inclines or curves inward and downward, and its lower or cutting end is curved into a semi-tubular form, as shown in Fig. 1. The knife S is made of such a length that its lower or cutting end will enter the ground to such a depth as to pass beneath the bulb of the turnips and cut off the top roots, so that the turnips can be readily picked.

The draft is applied to a bar, U, the ends of which are bent to the rearward and are secured to the front cross-bar of the frame A. Several holes are formed in the draft-bar U, so that the point of draft attachment can be adjusted as may be required.

V is a tooth the shank of which is designed to be attached to the frame A, and which is so formed as to pass down in the ground along the side of carrots and other long roots to loosen the soil around and below the said roots, and thus allow them to be easily pulled. The tops of the carrots can be cut off with a sharp hoe before loosening them with the tooth V.

Having thus fully described my invention, I claim as new and desire to secure by Letters Patent—

1. The controlling mechanism J K N, combined and arranged, in connection with the topping-knife G, to operate as described.

2. The combination, with the rods J J, holding up the front end of cutter G, of the hook-nut M, the spiral spring N, the hook O on block P, and the chain R, as and for the purpose specified.

JOHN BARTLETT.

Witnesses:
 JOHN S. SARKE,
 SAMUEL LUKE.